United States Patent [19]
Kikuchi et al.

[11] Patent Number: 6,135,093
[45] Date of Patent: Oct. 24, 2000

[54] PLUNGER PUMP

[75] Inventors: Hideya Kikuchi; Etsuro Hozumi; Akinao Minegishi; Hitoshi Okuyama; Akinori Yamazaki, all of Higashi-Matsuyama, Japan

[73] Assignee: Zexel Corporation, Tokyo, Japan

[21] Appl. No.: 09/256,071

[22] Filed: Feb. 24, 1999

[30] Foreign Application Priority Data

Mar. 2, 1998 [JP] Japan ................................. 10-66163

[51] Int. Cl.⁷ ................................................ F02M 37/04
[52] U.S. Cl. .......................................................... 123/467
[58] Field of Search ................................. 123/495, 446, 123/447, 467, 456

[56] References Cited

U.S. PATENT DOCUMENTS

| | | | |
|---|---|---|---|
| 3,507,263 | 4/1970 | Long | 123/456 |
| 5,146,894 | 9/1992 | Rembold | 123/447 |
| 5,456,233 | 10/1995 | Felhofer | 123/447 |
| 5,471,959 | 12/1995 | Sturman | 123/447 |
| 5,642,714 | 7/1997 | Buckley | 123/447 |
| 5,832,904 | 11/1998 | Morishita et al. | 123/514 |

*Primary Examiner*—Thomas N. Moulis
*Attorney, Agent, or Firm*—Wenderoth, Lind & Ponack, L.L.P.

[57] ABSTRACT

The plunger pump according to the present invention discharges fuel by reciprocation of a plunger, and comprises metallic diaphragm type dampers, provided at a fuel inlet side and a fuel outlet side, respectively, for reducing pressure pulsation of fuel. Each metallic diaphragm type damper comprises a pressure chamber for receiving fuel pressure, a back pressure chamber into which gas is charged, and a metallic diaphragm for defining the pressure chamber and the back pressure chamber. Since the metallic diaphragm type dampers are provided at the fuel inlet side and the fuel outlet side, respectively, noise and vibration caused by pressure pulsation are reduced at the fuel inlet side and the fuel outlet side. Also, since the diaphragms are metallic diaphragms, deterioration thereof generated by fuel liquid and back pressure gas is low, reliability is high, and the lifetime is long.

6 Claims, 5 Drawing Sheets

PLUNGER PUMP

BACKGROUND OF THE INVENTION

1. Field of the Invention

The present invention relates to a plunger pump for injecting fuel by reciprocating a plunger, and particularly to a single-cylinder type plunger pump for supplying fuel to a common rail of an engine.

2. Description of the Related Art

Generally, in a fuel injection apparatus for directly injecting fuel into a combustion chamber of an internal combustion engine, a configuration having a damper for reducing pressure pulse of fuel is known.

In this kind of fuel injection apparatus, low-pressure fuel supplied from a low-pressure pump is pressurized to supply high-pressure fuel to a common rail. For this reason, there is known a configuration comprising a damper for reducing pressure pulsation in the apparatus in order to decrease pressure pulsation of fuel to be supplied under pressure.

For example, Japanese Patent Unexamined Publication Hei No. 7-83137 discloses a configuration in which an accumulator (damper) is provided at a discharge side (fuel outlet side) of a high-pressure pump. In this accumulator, the pressure of the fuel, which a diaphragm receives, is reduced by a spring provided at a back pressure side of the diaphragm.

Also, Japanese Patent Unexamined Publication Hei No. 9-177634 discloses the configuration in which a spring-type accumulator reservoir (damper) is provided at a suction side (fuel inlet side) of a high-pressure pump.

In a single cylinder type plunger pump, which pressurizes fuel by reciprocation of the plunger, however, pressure pulsation occurs on both the fuel suction side and the fuel discharge side. For this reason, if the damper is provided at either the fuel suction side or the fuel discharge side, there is a problem in that noise and vibration caused by pressure pulsation cannot be sufficiently reduced.

In order to solve such a problem, it can be considered that the damper for reducing pressure pulsation is provided at each of the fuel suction side and the discharge side.

In this case, it is considered that the spring-type damper as disclosed in the above publication is provided at each of the fuel suction side and the discharge side. However, in the configuration using the spring on the back pressure side of the damper, rubber is used as a diaphragm and such a rubber diaphragm is susceptible ot deterioration caused by the fuel. For this reason, there is a problem in that reliability is low.

Moreover, the use of the spring to apply back pressure requires a space for containing the spring. This causes a problem in that the apparatus becomes large-sized.

SUMMARY OF THE INVENTION

An object of the present invention is to provide a plumber pump wherein noise and vibration can be reduced, high reliability can be obtained, and an apparatus can be downsized.

According to an aspect of the present invention, there is provided a plunger pump for sucking fuel from a fuel inlet side and discharging fuel from a fuel outlet side by reciprocation of a plunger comprising:

a main body for containing the plunger;

a first diaphragm type damper, provided at the fuel inlet side of the main body, for reducing pressure pulsation of fuel, wherein the first diaphragm type damper includes a first pressure chamber section having a first pressure chamber for receiving fuel pressure, a first back pressure chamber section having a first back pressure chamber into which gas is charged, and a first metallic diaphragm for partitioning the first pressure chamber and the first back pressure chamber, and said first diaphragm type damper reduces pressure pulsation of fuel by deformation of the first metallic diaphragm; and a second diaphragm type damper, provided at the fuel outlet side of the main body, for reducing pressure pulsation of fuel, wherein the second diaphragm type damper includes a second pressure chamber section having a second pressure chamber for receiving fuel pressure, a second back pressure chamber section having a second back pressure chamber into which gas is charged, and a second metallic diaphragm for partitioning the second pressure chamber and the second back pressure chamber, and the second diaphragm type damper reduces pressure pulsation of fuel by deformation of the second metallic diaphragm.

According to the invention, the plunger pump comprises first and second diaphragm type dampers provided at the fuel inlet side (suction side) and the fuel outlet side (discharge side), respectively. For this reason, pressure pulsation is reduced at the fuel inlet side and the fuel outlet side, respectively, and therefore, noise and vibration in the plunger pump are reduced. During driving, in the first and second diaphragm type dampers provided at the fuel inlet side and the fuel outlet side, respectively, a pressure variation, which each pressure chamber has received, is relaxed by gas pressure of each back pressure chamber. Since gas is charged into each back pressure chamber and there is no need of containing a spring, each back pressure chamber can be downsized, and the entire plunger pump can be miniaturized. Also, since the metallic diaphragms are used as the diaphragms for partitioning each pressure chamber and each back pressure chamber, deterioration caused by fuel and back pressure gas is low, reliability of the plunger pump is high, and the lifetime thereof is long.

It is preferable to provide a stopper member for restricting deformation of the second metallic diaphragm to the second back pressure chamber side in the second back pressure chamber section of the second diaphragm type damper. The provision of the stopper member can prevent the second metallic diaphragm from being excessively deformed and displaced. This can prevent damage of the second metallic diaphragm and improve durability of the second metallic diaphragm.

The first pressure chamber section of the first diaphragm type damper is formed in the main body, and the first back pressure chamber section and the first metallic diaphragm, which are provided separately from the main body, constitute one unit. Moreover, gas is preferably charged into the first back pressure chamber of the unit in advance before being attached to the main body. The unit having the gas-charged first back pressure chamber is only fixed to the main body and the incorporation of the first diaphragm type damper becomes easy. Since the first diaphragm type damper is a low pressure damper, considerable deformation of the first metallic diaphragm rarely occurs even if gas is charged in advance.

In the main body, a concave portion is formed, and at least one of the first and second diaphragm type dampers is preferably contained in the concave portion. Since at least one of the first and second diaphragm type dampers is contained in the concave portion, at least one of the first and second diaphragm type dampers can be prevented from being projected from the main body, and the plunger pump can be made compact.

The plunger pump is connected to a common rail for directly injecting fuel into a combustion chamber of an internal combustion engine, and the plunger pump preferably supplies fuel discharged from the fuel outlet side to the common rail. In the direct fuel injection apparatus, since a reduction in pressure pulsation is required, it is useful to mount such a plunger on the direct fuel injection apparatus.

The first and second metallic diaphragms are preferably made of stainless steel. The use of stainless steel further reduces deterioration caused by fuel and back pressure gas, and further increases reliability of the plunger pump. Also, the lifetime of the diaphragm type damper is further increased.

DETAILED DESCRIPTION OF THE PREFERRED EMBODIMENTS

Figure 1:
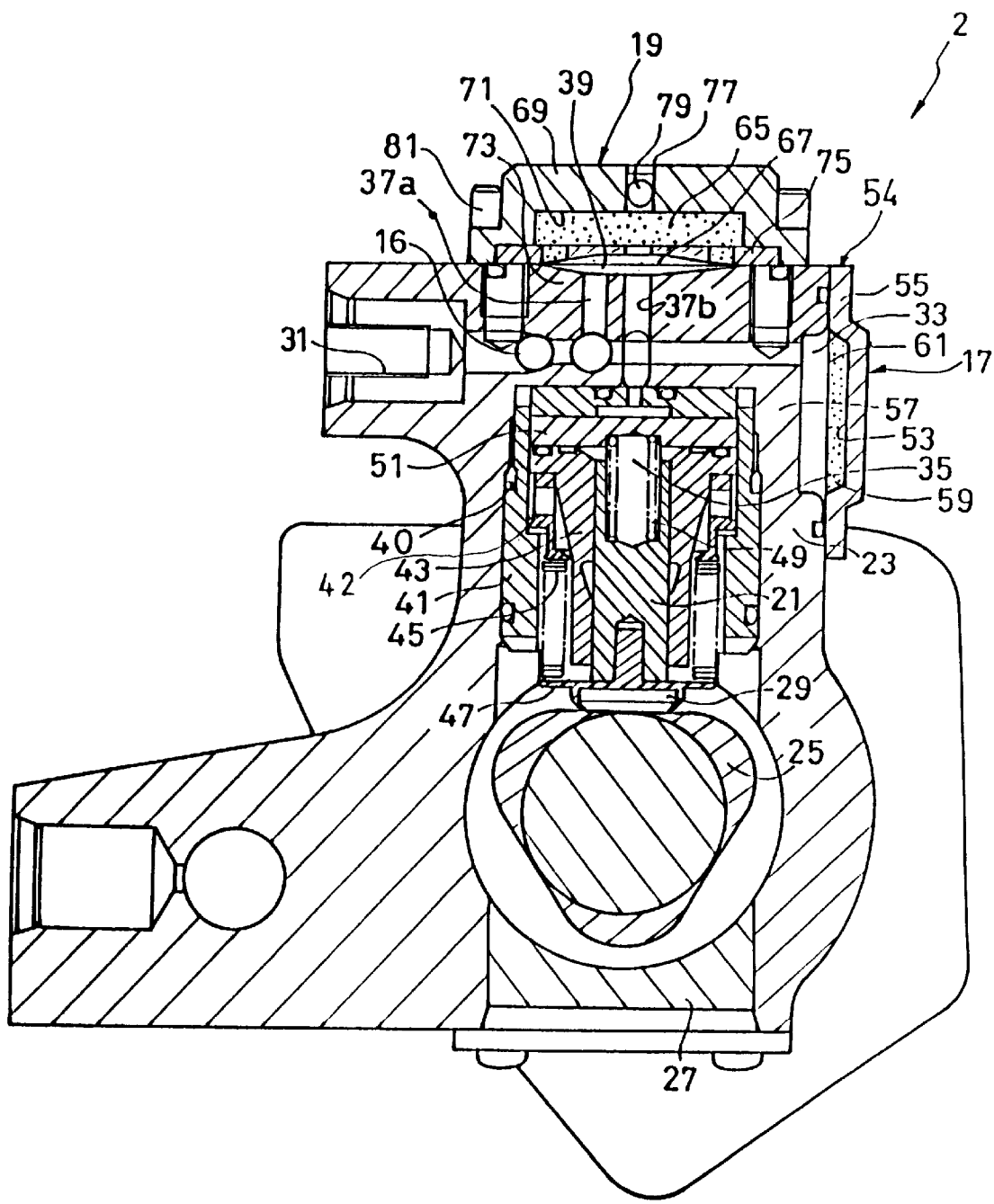
FIG. 1 is a cross-sectional view of a high-pressure pump according to an embodiment of the present invention.

Embodiments of the present invention will now be specifically described with reference to FIGS. 1 to 4 of the accompanying drawings. FIG. 4 is a circuit diagram of a fuel injection apparatus 1 on which a high-pressure pump (plunger pump) 2 according to an embodiment of the present invention is mounted. The fuel injection apparatus 1, which directly injects gasoline into a combustion chamber (cylinder) of a gasoline engine, is used as the so-called direct injection type gasoline injection apparatus. The fuel injection apparatus 1 comprises a fuel tank 3, a low-pressure pump 5 disposed in the fuel tank 3, the high-pressure pump 2 to which fuel is supplied from the low-pressure pump 5, and a common rail 11 serving as an accumulator for accumulating fuel press-supplied from the high-pressure pump 2.

The high-pressure pump 2 pressurizes fuel supplied from the low-pressure pump 5 to a high-pressure. The high-pressure pump 2 is driven by the engine to pressurize fuel to a high-pressure and to be supplied to the common rail 11 under pressure. The high-pressure pump 2 is provided with a filter 10 at a fuel supply side from the low-pressure pump 5. A check valve 16 is provided between a plunger-type pump 9 and the common rail 11 to prevent back-flow of fuel to the high-pressure pump 9 from the common rail 11. A plurality of injectors 15 is connected to the common rail 11, and fuel accumulated at high-pressure at the common rail 11 is directly injected into the cylinder (combustion chamber of the internal engine) of the engine from each of the injectors 15.

A low-pressure damper (first diaphragm type damper) 17 is provided at a fuel inlet side (suction side) of the pump 9.

A high-pressure damper (second diaphragm type damper) 19 is provided at a fuel outlet side (discharge side) of the pump 9. Then, they are configured to reduce fuel pressure pulsation at the fuel inlet side and the fuel outlet side, respectively. The low-pressure damper 17 and the high-pressure damper 19 will be described later.

A channel 20 is connected between the check valve 16 and the common rail 11 and between the low-pressure damper 17 and the filter 10 via a check valve 18. Thereby, fuel from the low-pressure pump 5 can be directly supplied to the common rail 11 at the time of starting the engine in which pressure of the common rail 11 is not fully increased.

Figure 2:
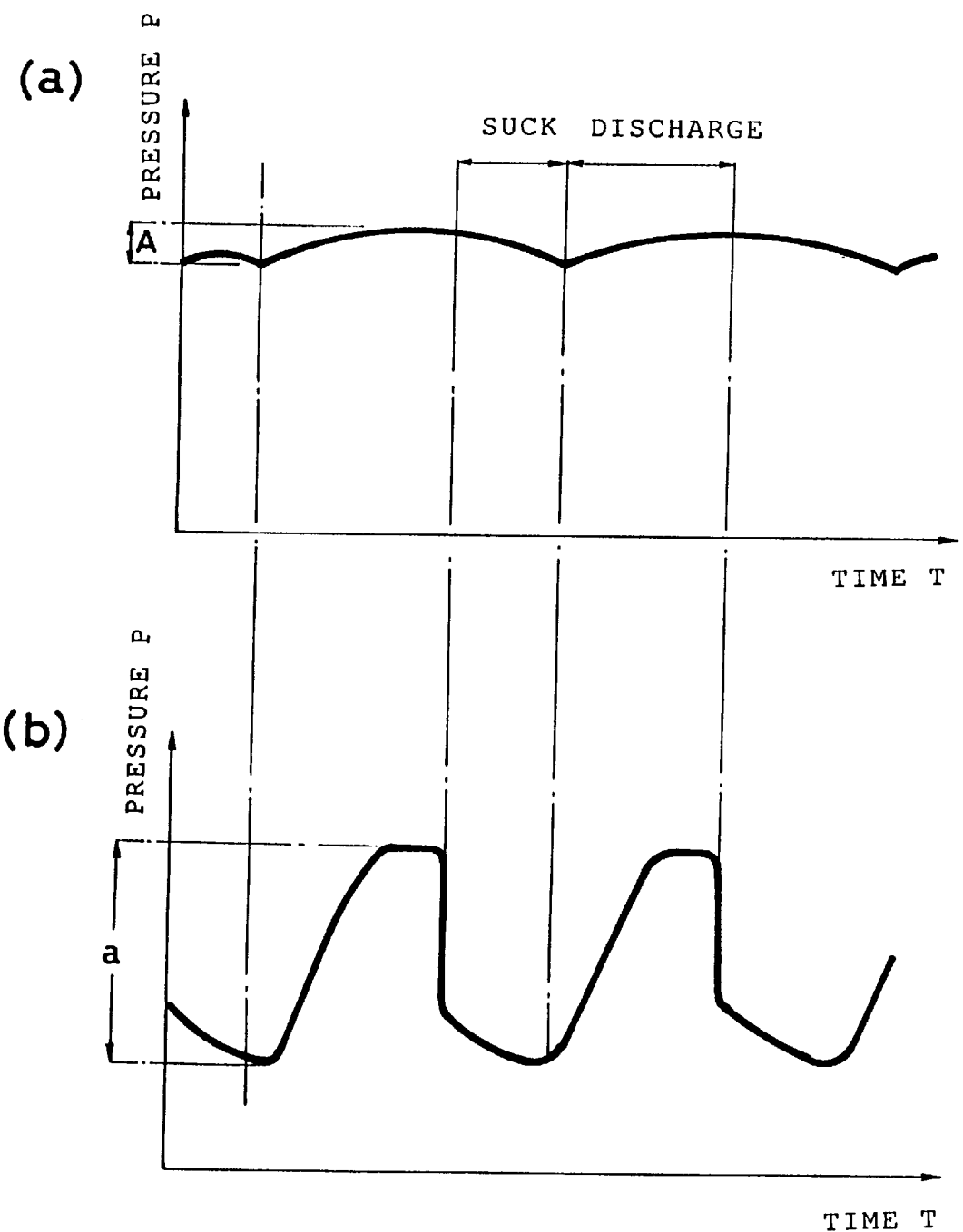
FIG. 2 is a graph showing pressure pulsation on a fuel discharge side of the high-pressure pump according to the embodiment of the present invention in comparison with prior art.
Figure 3:
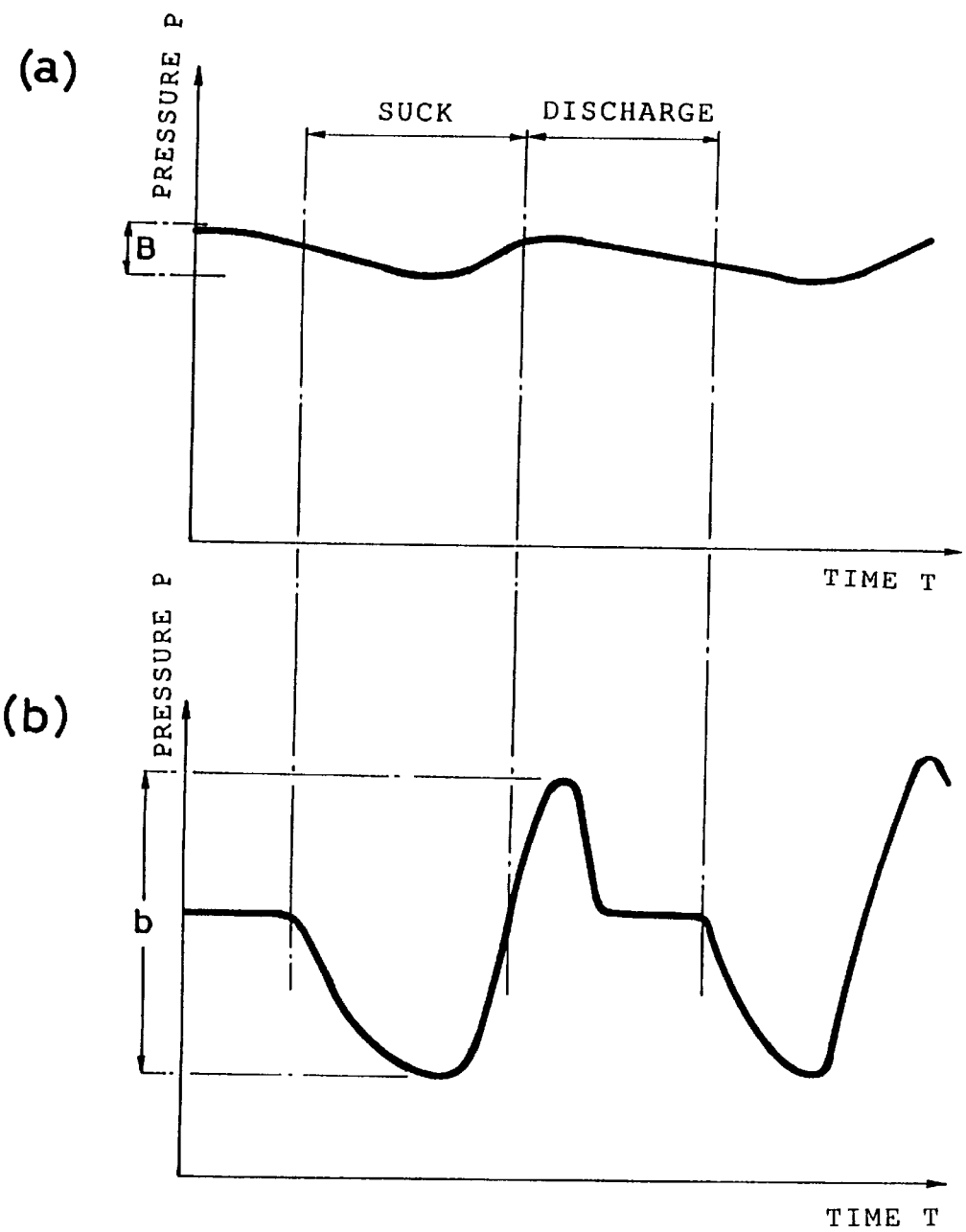
FIG. 3 is a graph showing pressure pulsation on a fuel inlet side of the high-pressure pump according to the embodiment of the present invention in comparison with prior art.
Figure 4:
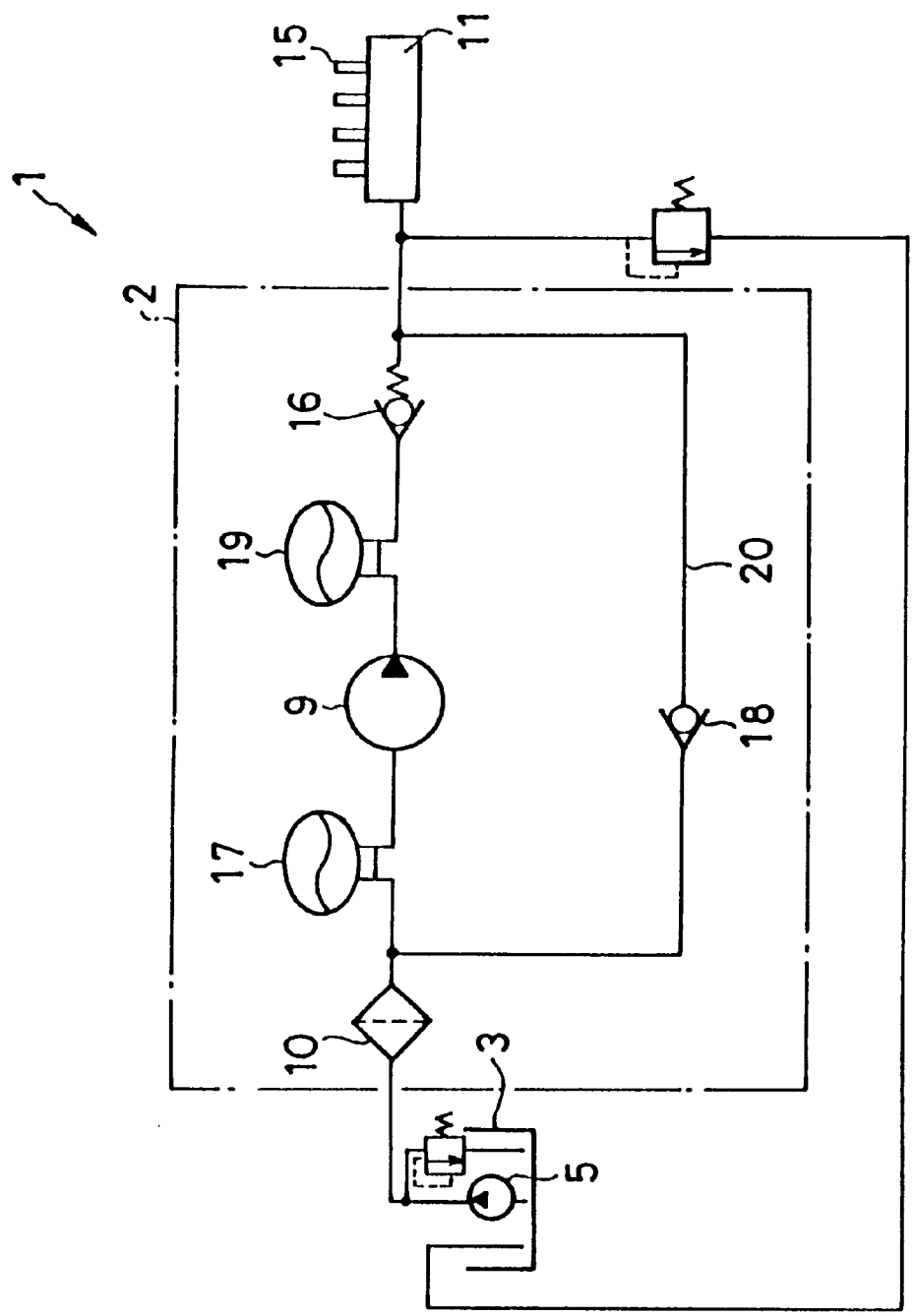
FIG. 4 is a circuit diagram of a fuel injection apparatus.

FIG. 1 is a cross-sectional view of the high-pressure pump 2, FIG. 2 is a graph showing a pressure variation on the discharge side in comparison with prior art, and FIG. 3 is a graph showing a pressure variation on the suction side in comparison with the prior art.

The high-pressure pump 2 is a single type plunger pump, and comprises a pump housing 23, serving as a main body containing a plunger 21, and a lower main body 27 containing a cam 25 for driving the plunger 21. The cam 25 is driven by an engine (not shown). More specifically, the cam 25 is configured to be rotated by the drive shaft of the engine, and peripherally contacts a shoe 29 provided at a lower end of the plunger 21, thereby reciprocating the plunger 21.

The pump housing 23 is provided with a suction port (not shown) where low-pressure fuel is supplied from the low-pressure pump 5, and a discharge port 31 for discharging fuel pressurized by the plunger 21.

The suction port (not shown) is communicated with a pressure chamber (first pressure chamber) 33 of the low-pressure damper 17 provided in the pump housing 23, and the pressure chamber 33 of the low-pressure damper 17 is further communicated with a pump chamber 35. On the other hand, the discharge port 31 is communicated with a pressure chamber (second pressure chamber) 39 of the high-pressure damper 19 through a fuel discharge channel 37a, and the pressure chamber 39 is communicated with the pump chamber 35 through a fuel discharge channel 37b.

A fixing member 41 is screwed into a large diameter hole 40 formed in the pump housing 23, and a barrel 43 for guiding the sliding of the plunger 21 is secured to the inner side of the fixing member 41. A bellows 45 is placed in the inner side of the fixing member 41 such that its axis is substantially conformed to an axis of the plunger 21. An upper end of the bellows 45 is fixed to a member 42 provided at an inside of the fixing member 41 incorporated into the pump housing 23. On the other hand, a lower end of the bellows 45 is fixed to a support member 47 attached to the lower end of plunger 21. The bellows 45 is made of metal, and expands and contracts in synchronization with the reciprocation of the plunger 21 in order to improve liquid tightness of fuel around the plunger 21.

The aforementioned barrel 43 for guiding the sliding of the plunger 21 is fixed in the inside of the bellows 45, and the plunger 21 is moved up and down along the barrel 43.

The plunger 21 has a hollow portion whose upper end is open, and a lower end portion of a spring 49 is brought into contact with the hollow portion thereof. The spring 49 always urges the plunger 21 downwardly, and an upper end of the spring 49 is supported by a lower surface of a fixing member 51. Then, the pump chamber 35 for pressurizing fuel is formed between the lower surface of the fixing member 51 and the plunger 21.

The low-pressure damper 17 comprises a pressure chamber section (first pressure chamber section) 57 having the pressure chamber (first pressure chamber) 33 for receiving fuel pressure, a half-body (first back pressure chamber section) 55 having a back pressure chamber (first back pressure chamber) 59 into which low-pressure gas is charged, and a first metallic diaphragm 61 for partitioning the pressure chamber 33 and the back pressure chamber 59. Then, fuel pressure pulsation, which the pressure chamber 33 has received, is reduced by deformation of the first metallic diaphragm 61. More specifically, the half-body 55 having a concave portion 53, the pressure chamber section 57 formed in the pump housing 23, and the first metallic diaphragm 61 are mounted onto the low-pressure damper 17. The half-body 55 and the first metallic diaphragm 61 constitute one unit 54, and the unit 54 is provided separately from the pump housing 23.

Low-pressure gas of 3 kgf/cm$^2$, for example, is charged into the back pressure chamber 59. Unlike the prior art, since no spring is contained therein, the low-pressure damper 17 can be simplified and downsized. Also, in this embodiment, the gas-charged unit 54 is only fixed to the pressure chamber section 57 of the pump housing 23, the mounting onto the pump housing 23 is easily established.

In the first metallic diaphragm 61, although there is no limitation of the thickness and material in particular, steel (SUS 304) having a thickness of about 0.1 mm, for example, is used.

The configuration of the high-pressure damper 19 is substantially the same as that of the above-mentioned low-pressure damper 17. In other words, the high-pressure damper 19 comprises a pressure chamber section (second pressure chamber section) 73 having the pressure chamber (second pressure chamber) 39 for receiving fuel pressure, a half-body (second back pressure chamber section) 69 having a back pressure chamber (second back pressure chamber) 65 into which high-pressure gas is charged, and a second metallic diaphragm 67 for partitioning the pressure chamber 39 and the back pressure chamber 65. Then, fuel pressure pulsation, which the pressure chamber 39 has received, is reduced by deformation of the second metallic diaphragm 67. More specifically, the half-body 69 having a concave portion 71, the pressure chamber section 73 formed in the pump housing 23, and the second metallic diaphragm 67 are mounted onto the high-pressure damper 19.

The half-body 69 is provided with a restriction member (stopper member) 75 for restricting deformation of the second metallic diaphragm 67 in order to prevent the second metallic diaphragm 67 from being deformed and displaced excessively. High-pressure gas of 40 kgf/cm$^2$, for example, is charged into the back pressure chamber 65.

In the second metallic diaphragm 67, although there is no limitation of the thickness and material in particular, steel (SUS 304) having a thickness of about 0.2 mm, for example, is used.

It should be noted that a charge port 77 for charging high-pressure gas into the back pressure chamber 65 is formed in the half-body 69, and that a sealing stopper 79 is inserted into the charge port 77.

Also, the half-body 69 is firmly secured to the pump housing 23 with a bolt 81.

The above-explained low-pressure damper 17 and high-pressure damper 19 are configured such that the pump housing 23 serves as both pressure chamber sections 57 and 73 without manufacturing the pressure chamber sections 57 and 73 separately. Therefore, a reduction in the number of components and a downsizing of the pump can be attained.

Next, actions of this embodiment will be explained.

When the cam 25 rotates, the plunger 21 is reciprocated via the shoe 29. This pressurizes fuel of the pump chamber 35. Then, high-pressure fuel is discharged from the discharge port 31 through the discharge channel 37b, the high-pressure damper 19, and the discharge channel 37a. In the high-pressure damper 19, fuel pressure pulsation, which the pressure chamber 39 has received, is reduced by deformation of the second metallic diaphragm 67 supported by high-pressure gas of the back pressure chamber 65. This leads to the reduction in noise and vibration caused by pressure pulsation on the high-pressure side.

On the other hand, on the suction side, low-pressure fuel supplied from the low-pressure pump 5 is introduced into the pump chamber 35 from the suction port through the low-pressure damper 17. In the low-pressure damper 17, when the pressure chamber 33 receives pressure of the low-pressure fuel, pressure pulsation is reduced by deformation and displacement of the first metallic diaphragm 61. In other words, since pressure pulsation on the low-pressure side can be reduced by the low-pressure damper 17, noise and vibration can be restrained even on the low-pressure side.

Thus, the high-pressure pump 2 according to this embodiment comprises the low-pressure damper 17 and the high-pressure damper 19 at the fuel inlet side and the fuel outlet side, respectively. As a result, pressure pulsation is reduced on each of the fuel inlet side and the fuel outlet side, and noise and vibration in the high-pressure pump 2 are reduced. Also, gas is charged into the back pressure chambers 59, 65 of the low-pressure damper 17 and the high-pressure damper 19, respectively, and it is unnecessary to contain the spring therein. As a result, the back pressure chambers 59 and 65 can be reduced in size, and the entire high-pressure pump 2 can be downsized.

Moreover, since the first and second metallic diaphragms 61, 67 are used as diaphragms, deterioration thereof caused by liquid fuel and back pressure gas is low, and reliability of the apparatus is high, and the lifetime thereof becomes long. Particularly, the use of steel as diaphragms as in this embodiment further reduces deterioration caused by fuel and back pressure gas, and further increases reliability of the apparatus. Moreover, the lifetime of the low-pressure and high-pressure dampers 17 and 19 is increased, and that of the apparatus is also increased.

Then, effects of this embodiment will be specifically explained with reference to FIGS. 2 and 3. FIG. 2 shows a pressure pulsation on the fuel discharge side (high-pressure side) wherein a vertical axis denotes pressure P and a horizontal axis denotes time T. FIG. 2 (a) is a case in which the high-pressure damper 19 according to this embodiment is mounted, and FIG. 2 (b) shows a change in pressure of the conventional high-pressure pump having no high-pressure damper 19 mounted.

As is obvious from FIG. 2, in the pump suction and discharge processes by the reciprocation of the plunger 21, pressure pulse a occurred in the conventional case shown in FIG. 2(b) and the conventional pressure pulse a was about 30 kgf/cm$^2$. In the embodiment of the present invention shown in FIG. 2 (a), pressure pulsation A was about 5 kgf/cm$^2$. Namely, according to this embodiment, pressure pulsation on the discharge side (high-pressure side) of the pump 2 was considerably reduced. Moreover, according to this embodiment, since energy stored in the high-pressure pump 19 during discharge is emitted during suction, the pressure variation is reduced overall. This makes it possible to reduce the pressure variation of fuel to be supplied to the common rail 11.

FIG. 3 shows a pressure variation on the fuel suction side (low-pressure side) wherein a vertical axis denotes pressure P and a horizontal axis denotes time T similar to FIG. 2. FIG. 3(a) is a case in which the low-pressure damper 17 according to this embodiment is mounted, and FIG. 3(b) shows a change in pressure of the conventional high-pressure pump having no low-pressure damper 17 mounted.

As is obvious from FIG. 3, pressure pulsation b occurred in the conventional case shown in FIG. 3(b) and the conventional pressure pulsation b was about 3 kgf/cm$^2$. In the embodiment of the present invention shown in FIG. 3(a), pressure pulsation B was about 0.2 kgf/cm$^2$. Namely, according to this embodiment, pressure pulsation on the suction side (low-pressure side) of the pump 2 was considerably reduced.

Thus, according to the embodiment of the present invention, pressure pulsation is reduced on the suction side and the discharge side, so that vibration and noise at the entire fuel inlet and outlet sides can be reduced. Also, pressure drop due to suction and abrupt pressure rise due to abrupt inlet valve closure are relaxed, so that fuel pressure to be supplied to the pump chamber 35 can be equalized, and the high-pressure pump 2 can be smoothly driven.

Next, another embodiment of the present invention will be explained with reference to FIG. 5. In the explanation set forth below, the same reference numerals are added to the portions common to the above-explained embodiment, and the detailed explanation is omitted.

Figure 5:
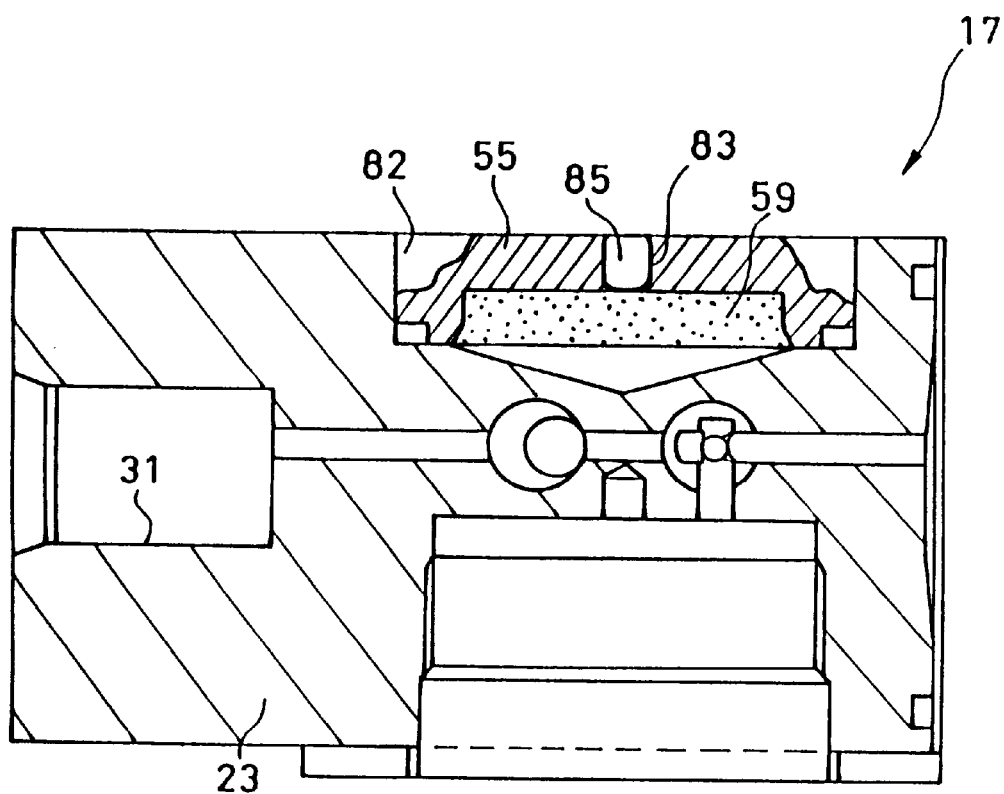
FIG. 5 is a cross-sectional view showing an attached state of a low-pressure damper according to another embodiment.

FIG. 5 shows the low-pressure damper 17 according to this embodiment of the present invention. In this embodiment, the low-pressure damper 17 is configured to be fit into a fitting concave portion 82 formed in the pump housing 23. Since the low-pressure damper 17 is not projected from the pump housing 23, the entire high-pressure pump 2 can be made compact. Moreover, low-pressure gas is charged to the back pressure chamber 59 from a charge port 83 formed in the half-body 55, and a sealing stopper 85 is inserted into the charge port 83 so as to seal the back pressure chamber 59. In this embodiment, the same actions as those of the aforementioned embodiment can be executed.

What is claimed is:

1. A plunger pump for sucking fuel from a fuel inlet side and discharging fuel from a fuel outlet side by reciprocation of a plunger, comprising:

a main body for containing the plunger;

a first diaphragm type damper, provided at the fuel inlet side of said main body, for reducing pressure pulsation of fuel, wherein said first diaphragm type damper includes a first pressure chamber section having a first pressure chamber for receiving fuel pressure, a first back pressure chamber section having a first back pressure chamber into which gas is charged, and a first metallic diaphragm for partitioning the first pressure chamber and the first back pressure chamber, and said first diaphragm type damper reduces pressure pulsation of fuel by deformation of the first metallic diaphragm; and a second diaphragm type damper, provided at the fuel outlet side of said main body, for reducing pressure pulsation of fuel, wherein said second diaphragm type damper includes a second pressure chamber section having a second pressure chamber for receiving fuel pressure, a second back pressure chamber section having a second back pressure chamber into which gas is charged, and a second metallic diaphragm for partitioning the second pressure chamber and the second back pressure chamber, and said second diaphragm type damper reduces pressure pulsation of fuel by deformation of the second metallic diaphragm.

2. The plunger pump according to claim 1, wherein the second back pressure chamber section of said second diaphragm type damper comprises a stopper member for restricting deformation of the second metallic diaphragm to the second back pressure chamber side.

3. The plunger pump according to claim 1, wherein the first pressure chamber section of said first diaphragm type damper is formed in the main body, the first back pressure chamber section and the first metallic diaphragm, provided separately from the main body, constitute one unit, and gas is charged into the first back pressure chamber of the unit in advance before being attached to the main body.

4. The plunger pump according to claim 1, wherein said main body has a concave portion, and at least one of the first and second diaphragm type dampers is contained in the concave portion.

5. The plunger pump according to claim 1, wherein said plunger pump is connected to a common rail for directly injecting fuel into a combustion chamber of an internal combustion engine, and supplies fuel discharged from the fuel outlet side to the common rail.

6. The plunger pump according to claim 1, wherein said first and second metallic diaphragms are made of stainless steel.

* * * * *